United States Patent [19]

Hikosaka et al.

[11] Patent Number: 5,650,784
[45] Date of Patent: Jul. 22, 1997

[54] DIGITAL AGC CIRCUIT FOR IMAGE PROCESSING

[75] Inventors: Ariyoshi Hikosaka; Tetsuji Kajitani, both of Osaka, Japan

[73] Assignee: Mita Industrial Co., Ltd., Osaka, Japan

[21] Appl. No.: 368,495

[22] Filed: Jan. 4, 1995

[30] Foreign Application Priority Data

Jan. 13, 1994 [JP] Japan ................................. 6-002197
Jan. 13, 1994 [JP] Japan ................................. 6-002198

[51] Int. Cl.⁶ ........................................... H03M 1/18
[52] U.S. Cl. ........................................... 341/139
[58] Field of Search ........................... 341/139, 120, 341/118, 155

[56] References Cited

U.S. PATENT DOCUMENTS 4,540,974  9/1985  Schanne et al. ..................... 341/139

*Primary Examiner*—Brian K. Young
*Attorney, Agent, or Firm*—Beveridge, Degrandi, Weilacher & Young, LLP

[57] ABSTRACT

Before actually reading a document image, white reference data corresponding to a pure white document image is found in an AGC processing unit 32, and is set in a register 32a. In a CPU 33, data corresponding to the white reference data set in the register 32a is produced. The produced data is set in a register 32b. The set data is applied to a D/A converting unit 34, where the data is converted into analog data, after which the analog data is applied as a low reference voltage $V_{ref}L$ to an A/D converting unit 31. As a result, the maximum amplitude range of the analog image data becomes approximately the same as the input voltage range. Accordingly, AGC processing can be realized in a digital manner, thereby to make it possible to simplify the circuit arrangement, as compared with the conventional circuit arrangement, and to easily make fine adjustment.

7 Claims, 9 Drawing Sheets

F I G. 4
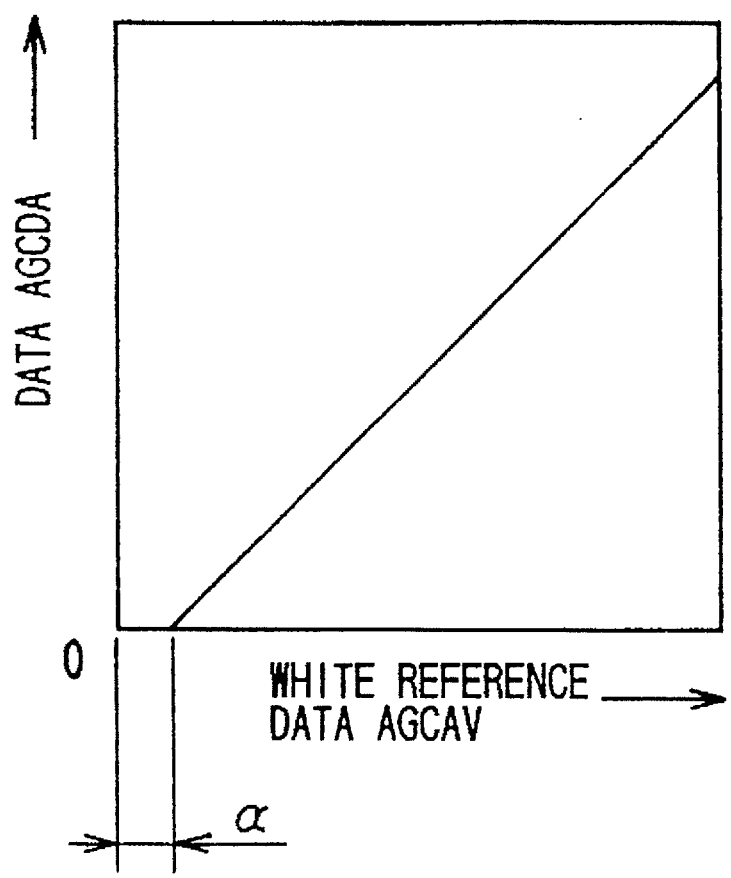

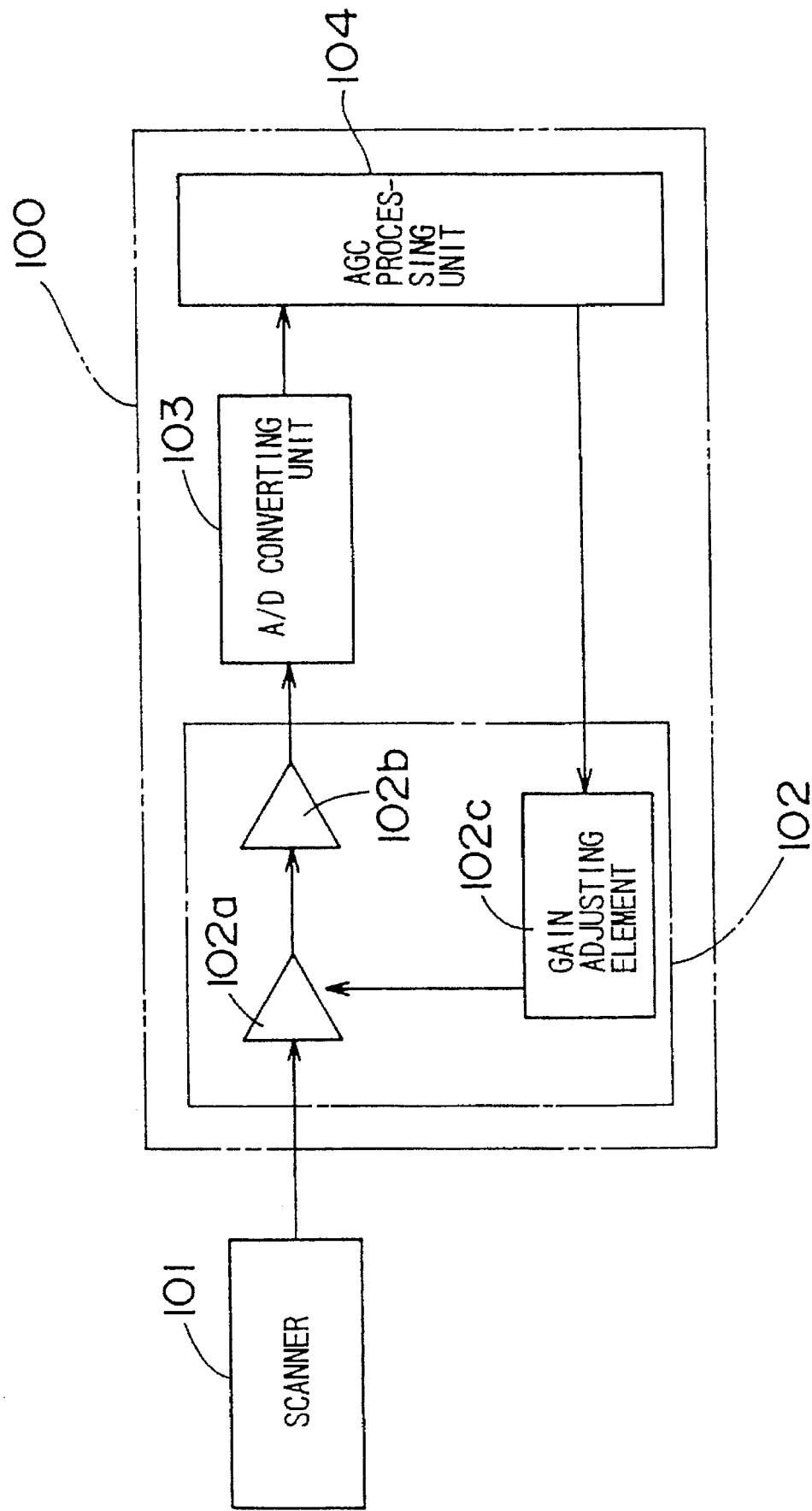

DIGITAL AGC CIRCUIT FOR IMAGE PROCESSING

BACKGROUND OF THE INVENTION

1. Field of the Invention

The present invention relates to a digital AGC circuit used in an image processing apparatus such as a facsimile or a digital copying machine for adjusting the dynamic range of an input signal in a digital manner.

2. Description of the Prior Art

In an image processing apparatus for optically reading an image and processing the image, for example, a facsimile or a copying machine, an image signal obtained by the reading has been conventionally subjected to AGC (Automatic Gain Control) processing so as to adjust the dynamic range of the image signal.

FIG. 9 is a block diagram for explaining one example of the electrical construction of an AGC circuit for realizing AGC processing. The AGC circuit 100 comprises an input interface unit 102, an analog-to-digital converting unit (hereinafter referred to as "A/D converting unit") 103 and an AGC processing unit 104. Image data outputted from a scanner 101 for reading an image of, for example, a CCD image sensor or a CIS image sensor is applied to the input interface unit 102. In the input interface unit 102, the applied image data is subjected to AGC processing. As a result, the dynamic range of the applied image data is adjusted.

Thereafter, the image data whose dynamic range is adjusted is applied to the A/D converting unit 103. In the A/D converting unit 103, the image data is converted into digital image data, after which the digital image data is applied to the AGC processing unit 104 for controlling the AGC processing in the input interface unit 102.

The AGC processing in the input interface unit 102 is performed on the basis of a gain control signal outputted from the AGC processing unit 104. More specifically, the input interface unit 102 comprises amplifying sections 102a and 102b in two stages for amplifying the image data outputted from the scanner 101 and a gain adjusting element 102c such as a variable resistive element for adjusting the gain of the amplifying section 102a in the front stage. The above described gain control signal is applied to the gain adjusting element 102c.

The gain adjusting element 102c adjusts, if it receives the gain control signal, the gain of the amplifying section 102a in the front stage in response to the gain control signal. As a result, the dynamic range of the image data outputted from the amplifying section 102a is adjusted.

The AGC processing is thus achieved.

In the above described AGC circuit 100, however, an analog element such as the gain adjusting element 102c is indispensable, resulting in a complicated circuit arrangement.

Furthermore, in the above described AGC circuit 100, the image data read by the scanner 101 is weak, thereby to make it extremely difficult to finely adjust the dynamic range. In the subsequent image processing, therefore, tone properties by density are degraded. On the other hand, an attempt to realize the fine adjustment requires a high-cost element, resulting in increased cost.

SUMMARY OF THE INVENTION

Therefore, an object of the present invention is to solve the above described technical problems and to provide a low-cost digital AGC circuit having a simple circuit arrangement and capable of performing AGC processing with high precision.

In a certain aspect of the present invention, an effective input voltage range of analog-to-digital converting means is so changed as to correspond to the maximum amplitude range of analog image data outputted from optically reading means. For example, the minimum value or the maximum value of the effective input voltage range of the analog-to-digital converting means is so changed as to correspond to the minimum value or the maximum value of digital image data. Therefore, such adjustment can be made that the dynamic range of the analog image data becomes maximum.

This AGC processing can be realized only by changing the effective input voltage range of the analog-to-digital converting means. In the present invention, an analog element such as a variable resistive element or its peripheral circuit need not be added.

Furthermore, the minimum value or the maximum value of the effective input voltage range of the analog-to-digital converting means may be changed, thereby to make it possible to easily make fine adjustment of the analog image data.

In accordance with another aspect of the present invention, the effective input voltage range of analog-to-digital converting means is changed until the minimum value or the maximum value of digital image data found by minimum value operating means or maximum value operating means become the same as an arbitrary value set by setting means.

For example, if the above described arbitrary value is set to a value smaller than the minimum value of the digital image data first found, the maximum amplitude range of the analog image data is substantially increased. That is, it is possible to make such adjustment that the dynamic range is increased.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a graph showing one example of a correspondence between white reference data AGCAV and data AGCDA;

FIG. 9 is a block diagram for explaining one example of the electrical construction of a conventional AGC circuit.

DETAILED DESCRIPTION OF THE PREFERRED EMBODIMENTS

Figure 1:
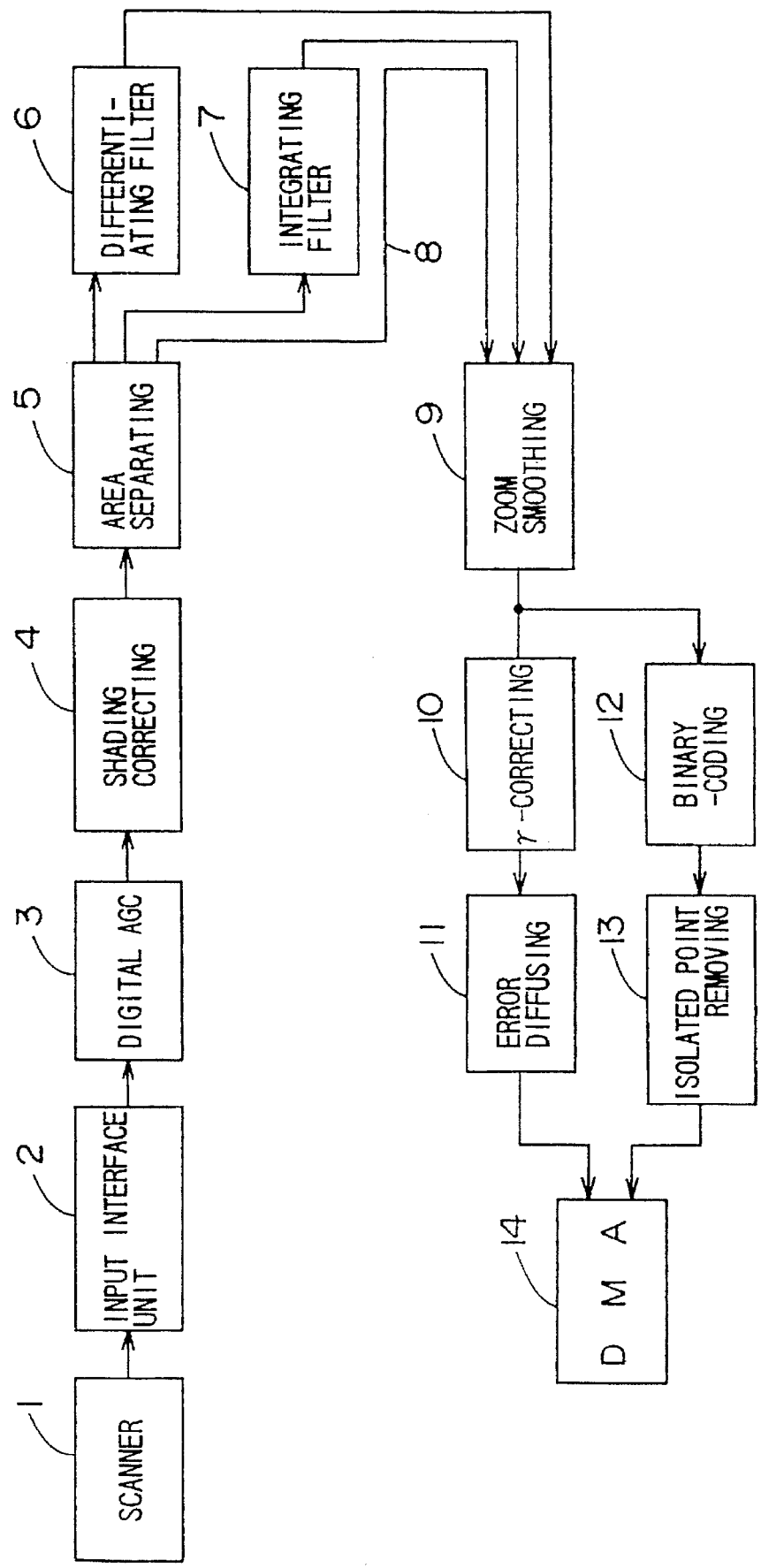
FIG. 1 is a block diagram showing the electrical construction of an image reading mechanism of a facsimile in which one embodiment of the present invention is incorporated.

FIG. 1 is a block diagram showing the electrical construction of an image reading mechanism in a facsimile in which one embodiment of the present invention is incorporated. Referring now to FIG. 1, image reading processing in the facsimile will be briefly described.

A document set in the facsimile is read by a scanner 1. The scanner 1 comprises an image sensor for reading an image, for example, a CCD image sensor or a CIS image sensor. The image sensor may be an area image sensor for reading two-dimensional data or a linear image sensor for reading line data. In order to construct the facsimile at low cost, the line image sensor is usually used.

Image data of the document read by the scanner 1 is applied to an input interface unit 2. In the interface unit 2, sample-hold processing of a signal, for example, is performed. The input interface unit 2 is constituted by an analog circuit in the present embodiment, and the above described processing is performed in an analog manner.

The image data processed in the input interface unit 2 is then applied to a digital AGC circuit 3. In the digital AGC circuit 3, gain control for causing the level of a signal (image data) to fall in a desired range is carried out, and the image data is converted from an analog signal to a digital signal.

The image data whose gain is controlled is then applied to a shading correcting circuit 4. In the shading correcting circuit 4, shading distortion is reduced or removed. The shading distortion is nonuniformity in the density between pixels caused by nonuniformity in illumination of a light source for reading in a case where the document is read by the scanner 1.

The image data whose shading distortion is reduced or removed is then applied to an area separating circuit 5. In the area separating circuit 5, it is judged which of image data obtained by reading characters (character data), image data obtained by reading a picture (picture data) and image data in halftone obtained by reading an image of a printed picture, for example, a picture of a newspaper, a magazine or the like (halftone data) is the inputted image data.

If the character data, the picture data and the halftone data are present as a mixture in the inputted image data, areas of each of the data are separated.

The reason why the areas are thus separated depending on the type of data is that processing suitable for the type of data is performed in the subsequent processing.

A differentiating filter 6, an integrating filter 7 and a path through circuit (a circuit through which a signal is only passed without being subjected to processing) 8 are connected in parallel on the output side of the area separating circuit 5 so as to perform different processing depending on the type of data whose areas are separated. The character data whose areas are separated is applied to the differentiating filter 6, where the contour of the character data is made clear. The halftone data is applied to the integrating filter 7, where the halftone data is smoothed. Further, the data other than the character data and the halftone data, that is, the picture data is applied to the path through circuit 8, and is directly sent to the succeeding circuit.

The image data is thus subjected to predetermined processing corresponding to the type or is subjected to no processing.

The data are applied to a zoom smoothing circuit 9. In the zoom smoothing circuit 9, when an image is enlarged or reduced, the enlargement or reduction processing and processing for correcting distortion of the image caused by the enlargement or reduction processing are performed. If the image is not enlarged nor reduced, the image data is not subjected to any processing in the zoom smoothing circuit 9.

The image data through the processing till the processing in the zoom smoothing circuit 9 is then subjected to processing in either one of the following circuits depending on the type.

Specifically, if the image data is the picture data or the halftone data and is subjected to halftone output processing, the image data is applied to a γ correcting circuit 10, where the sensitivity characteristics of the image data is corrected so as to correspond to the human eyes. The image data is further applied to an error diffusing circuit 11, where the image data is subjected to processing for good halftone representation.

On the other hand, if the image data is the character data and is subjected to binary-coding processing, the image data is applied to a binary-coding circuit 12. In the binary-coding circuit 12, a slice level for binary coding is adjusted, to divide a background and characters or lines, for example. At this time, automatic density adjustment processing is also so performed that the density becomes proper.

An output of the binary-coding circuit 12 is applied to an isolated point removing circuit 13, where isolated black and white points, for example, appearing due to noises or the like are removed.

The data through the foregoing processing are applied to a DMA (Direct Memory Access) circuit 14, where the data are outputted to a transmitting circuit (not shown) or are outputted to a printing circuit.

The present embodiment is related to the digital AGC circuit 3 in the above described image reading mechanism.

Figure 2:
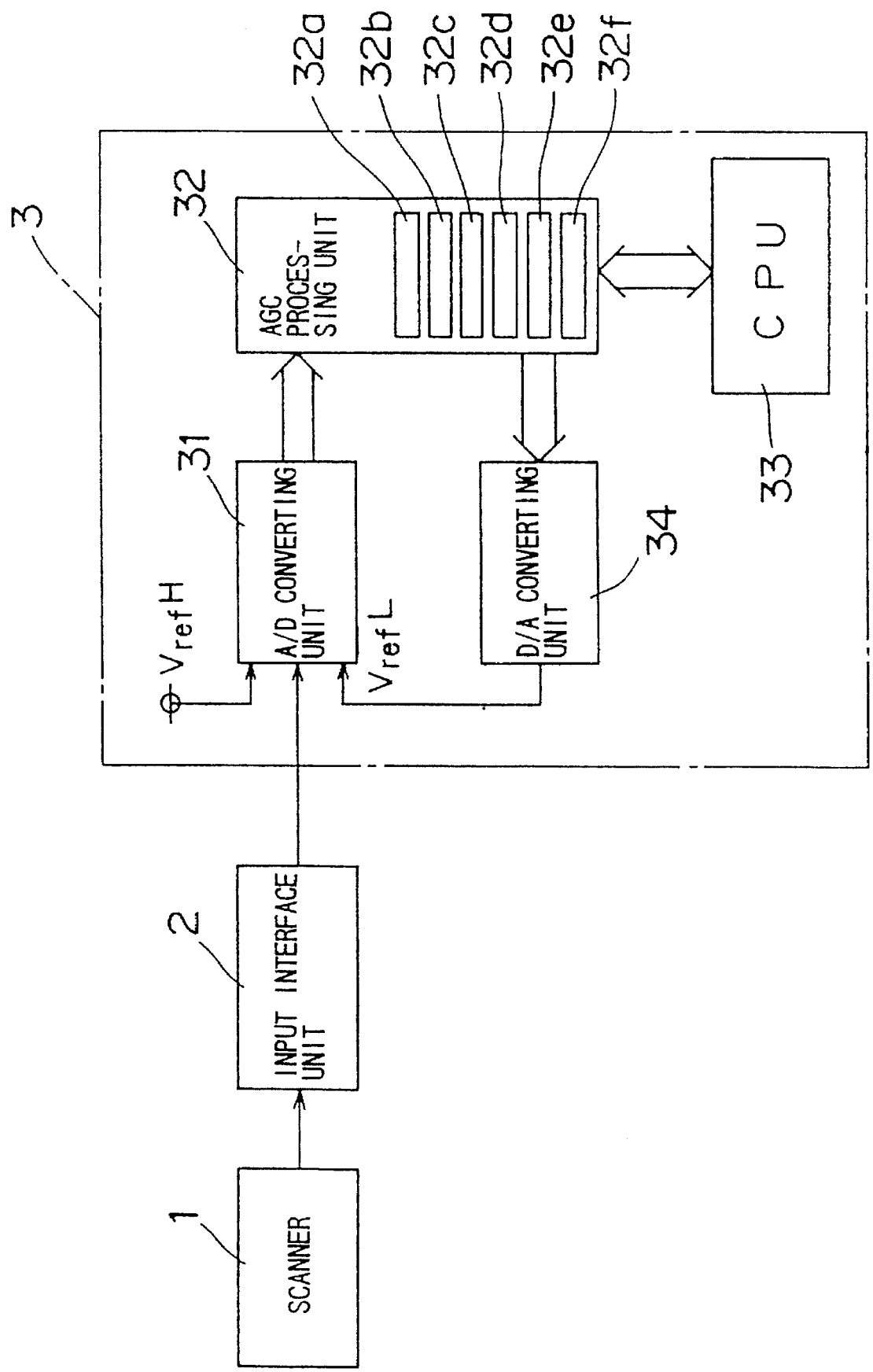
FIG. 2 is a diagram for explaining the construction of a digital AGC circuit constituting a part of the facsimile.

FIG. 2 is a diagram for explaining the construction of the digital AGC circuit 3 according to the present embodiment.

In the facsimile employing the digital AGC circuit 3 according to the present embodiment, a scanner in which the maximum output is obtained when a deep black document image is read and the minimum output is obtained when a pure white document image is read is employed as the scanner 1. As described in FIG. 1, an output of the scanner 1 is applied to the input interface unit 2.

In the input interface unit 2, amplification processing and clamping processing are performed in addition to the sample-hold processing. The clamping processing is so performed that the image data outputted from the scanner 1 when the deep black document image is read (hereinafter referred to as "black level data") becomes always constant. In the present embodiment, the clamping processing is so performed that the black level data always takes the upper limit value of an input voltage range of an A/D converting unit as described later. The image data which is subjected to the clamping processing is applied to the digital AGC circuit 3, as described in FIG. 1.

The digital AGC circuit 3 comprises an analog-to-digital converting unit (hereinafter referred to as "A/D converting unit) 31, an AGC processing unit 32, a CPU 33 and a digital-to-analog converting unit (hereinafter referred to as "D/A converting unit") 34.

The A/D converting unit 31 has resolution of n bits (for example, n=8) for converting the applied image data into $2^n$ (for example, 256 when n=8) types of digital image data and outputting the digital image data. A high reference voltage $V_{ref}H$ which is the upper limit value of the input voltage range FSR of the A/D converting unit 31 is previously set, which is fixed to 5 (V), for example. In addition, a low reference voltage $V_{ref}L$ which is the lower limit value of the input voltage range FSR is set by AGC processing as described later.

Digital image data outputted from the A/D converting unit 31 is applied to the AGC processing unit 32 for performing AGC processing as described later. The AGC processing unit 32 comprises registers 32a, 32b, 32c, 32d, 32e and 32f used for the AGC processing.

The CPU 33 for controlling the operation of the AGC processing unit 32 is connected to the AGC processing unit 32. In addition, the A/D converting unit 31 is connected to the AGC processing unit 32 through the D/A converting unit 34.

Figure 3:
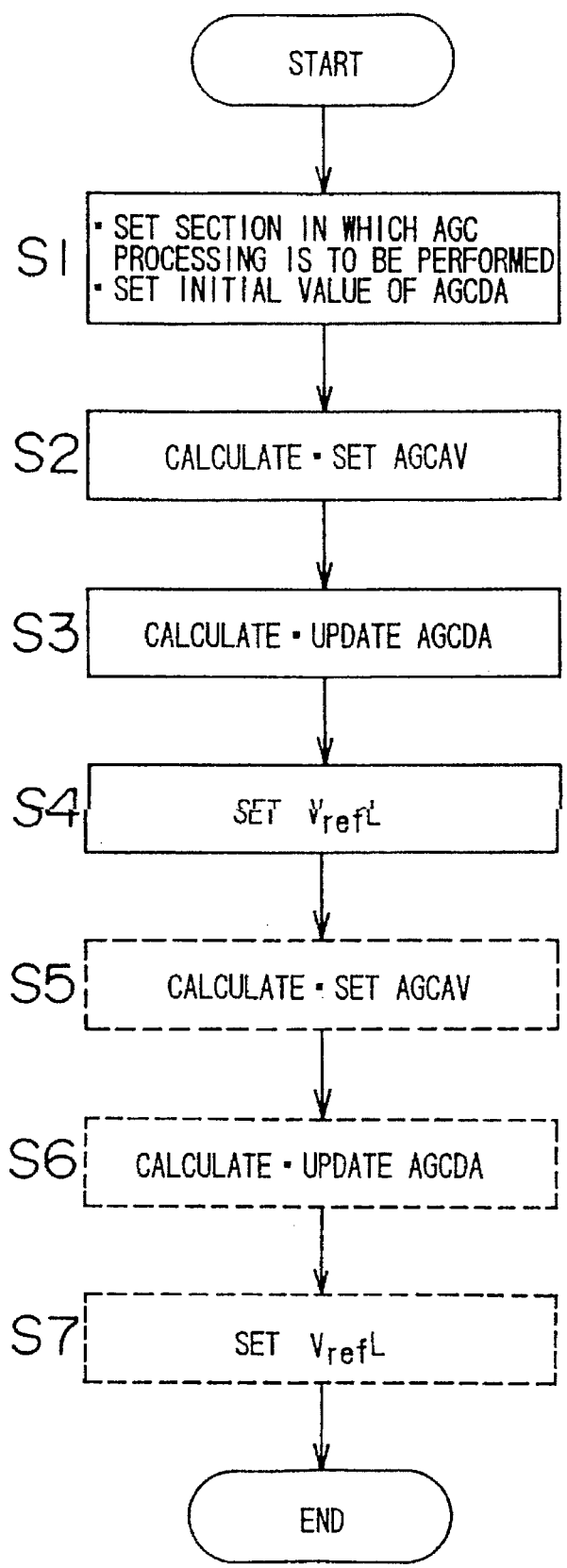
FIG. 3 is a flow chart for explaining one example of AGC processing in the digital AGC circuit.

FIG. 3 is a flow chart for explaining one example of the AGC processing in the above described digital AGC circuit 3.

Referring now to FIG. 3, one example of the AGC processing in the digital AGC circuit 3 shown in FIG. 1 will be described. This AGC processing is performed before actually reading a document image, and is performed so as to adjust the dynamic range of an image data outputted from the scanner 1. In the AGC processing shown in FIG. 3, the registers 32b and 32d out of the six registers provided in the AGC processing unit 32 shown in FIG. 2 are used.

In the step S1, a section in which AGC processing is to be performed is set, and the initial value of data AGCDA is set in the register 33d provided in the AGC processing unit 32. Specifically, the section in which AGC processing is to be performed is set to the length in the direction of main scanning of one line for reading of a white reference plate required for producing white reference data in the step S2 as described later. The initial value in the register 32d is set to a value at which a low reference voltage $V_{ref}L$ in the A/D converting unit 31 becomes 0 (V), for example. 00h (h is a sign for indicating that it is hexadecimal).

The data AGCDA set in the register 32d is applied to the D/A converting unit 34. The D/A converting unit 34 converts, if it receives the data AGCDA, the data AGCDA into analog data, and applies the analog data as a low reference voltage $V_{ref}L$ to the A/D converting unit 31.

In the step S2, white reference data AGCAV is produced in the AGC processing unit 32, and the produced white reference data AGCAV is set in the register 32b. The white reference data AGCAV is digital image data corresponding to a pure white document image, which is produced in the following manner, for example.

Specifically, the scanner 1 is caused to read a white reference plate on which a white reference image corresponding to the whitest image out of document images is formed one line at a time over m lines (for example, m=8) in a state where a light source for document illumination is turned on. At this time, the horizontal scanning of one line by the scanner 1 is performed over the length of the section in which AGC processing is to be performed which is set in the foregoing step S1. The minimum value of digital image data corresponding to one line is found for each line, and the average value of the minimum values found for the respective lines is found. The average value of the minimum values corresponds to the white reference data AGCAV. That is, the white reference data AGCAV corresponds to the lower limit value of the maximum amplitude range of the image data applied to the A/D converting unit 31.

In the step S3, the data AGCDA set in the register 32d is updated by the CPU 33. Specifically, the initial value (00h) is set in the register 32d in the step S1, and the initial value is reloaded with data AGCDA corresponding to the white reference data AGCAV.

More specifically, if the white reference data AGCAV is set in the register 32b in the AGC processing unit 32, the CPU 33 monitors the white reference data AGCAV set in the register 32b. The CPU 33 finds data AGCDA corresponding to the monitored white reference data AGCAV on the basis of a correspondence as described later, and the initial value set in the register 32d is reloaded with the data AGCDA.

Following equations representing a correspondence between the white reference data AGCAV and the data AGCDA which corresponds to a graph shown in FIG. 4 are previously stored in the CPU 33:

| AGCDA = 0 | (where $0 \leq AGCAV < \alpha$) |
| AGCDA = AGCAV − α | (where $AGCAV \geq \alpha$) |

In the equation, −α is data obtained by averaging the white reference data AGCAV, and is inserted so as to set the value of the data AGCDA slightly lower because the minimum value of image data outputted when the document image is actually read may be slightly smaller than the value of the white reference data AGCAV.

In the step S4, the low reference voltage $V_{ref}L$ for the A/D converting unit 31 is set in the D/A converting unit 34. The D/A covering unit 34 converts, if it receives the data AGCDA after updating which is set in the register 32d from the AGC processing unit 32, the applied data AGCDA into analog data. This analog data is applied as the low reference voltage $V_{ref}L$ to the A/D converting unit 31.

As described in the foregoing, before actually reading the document image, the low reference voltage $V_{ref}L$ in the A/D converting unit 31 is set to a voltage corresponding to the white reference data AGCAV. If it is considered that black level data is always clamped to a high reference voltage $V_{ref}H$ in the input interface unit 2, therefore, the maximum amplitude range of the image data applied to the A/D converting unit 31 and the input voltage range FSR of the A/D converting unit 31 are approximately the same.

Figure 5A:
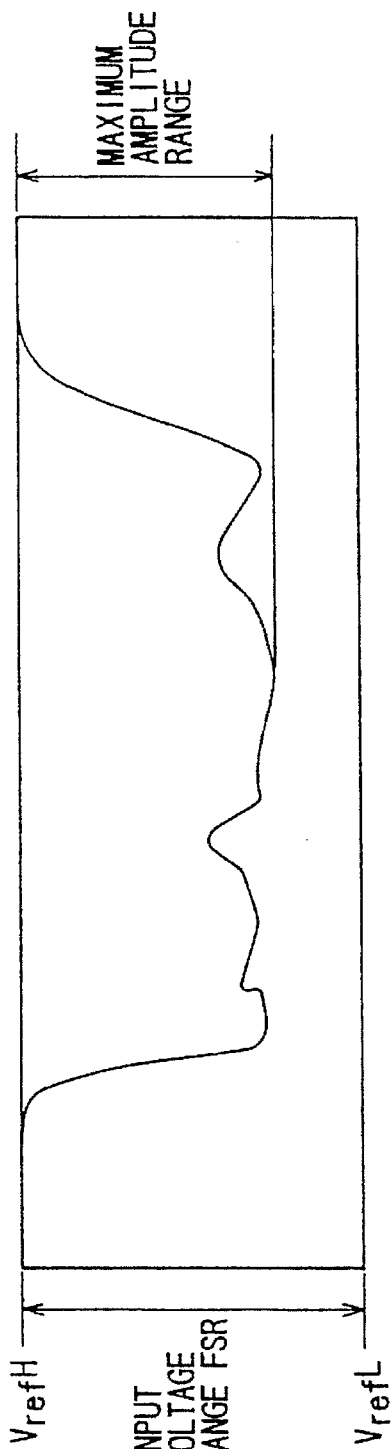
FIGS. 5(a) and 5(b) are diagrams for explaining the difference between the maximum amplitude ranges of image data.
Figure 5B:
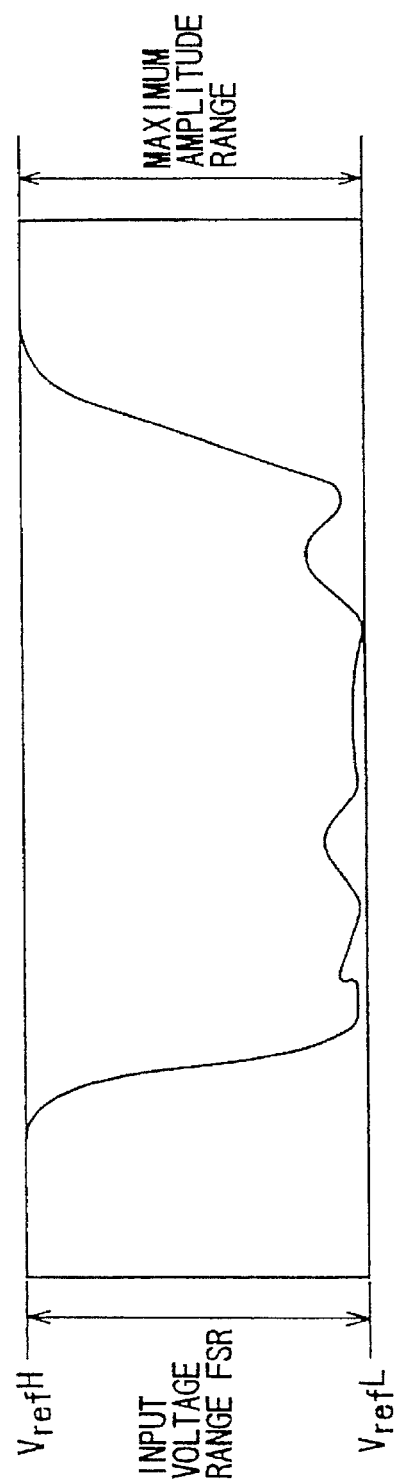

The foregoing will be described more specifically with reference to FIGS. 5(a) and 5(b). FIG. 5 (a) is a diagram showing a voltage waveform of the image data applied to the A/D converting unit 31 when the document image is actually read in a case where the above described AGC processing is not performed. FIG. 5(b) is a diagram showing a voltage waveform of the image data applied to the A/D converting unit 31 when the document image is actually read in a case where the above described AGC processing is performed. In both FIGS. 5(a) and 5(b), the vertical axis corresponds to the input voltage range FSR of the A/D converting unit 31.

As can be seen from comparison between both the figures, the maximum amplitude range of the image data and the input voltage range FSR of the A/D converting unit 31 are approximately the same by performing the AGC processing. That is, the dynamic range of the image data is approximately maximum.

If the same processing as that in the foregoing steps S2 to S4 is repeated again as shown in the steps S5 to S7, the AGC processing can be performed with higher precision. That is, the processing in the steps S5 to S7 may be performed as required.

As described in the foregoing, according to the present embodiment, in order to realize the AGC processing, the low reference voltage $V_{ref}L$ in the A/D converting unit 31 is only set to a voltage corresponding to the white reference data AGCAV. Therefore, the necessity for an analog element and its peripheral elements is eliminated. Therefore, it is possible to simplify the circuit arrangement, as compared with that in the prior art.

Furthermore, the effect of the variations among the elements constituting the digital AGC circuit can be reduced by simplifying the circuit arrangement, thereby to make it possible to perform stable AGC processing.

Additionally, the AGC processing is performed in a digital manner using the AGC processing unit 32 and the CPU 33, thereby to make it possible to easily make fine adjustment. For example, if an output of the A/D converting unit 31 is composed of 8 bits, the adjustment can be made by resolution of $2^8(=256)$. Consequently, no components for fine adjustment only are required. Therefore, it is possible to provide a low-cost AGC circuit.

Figure 6:
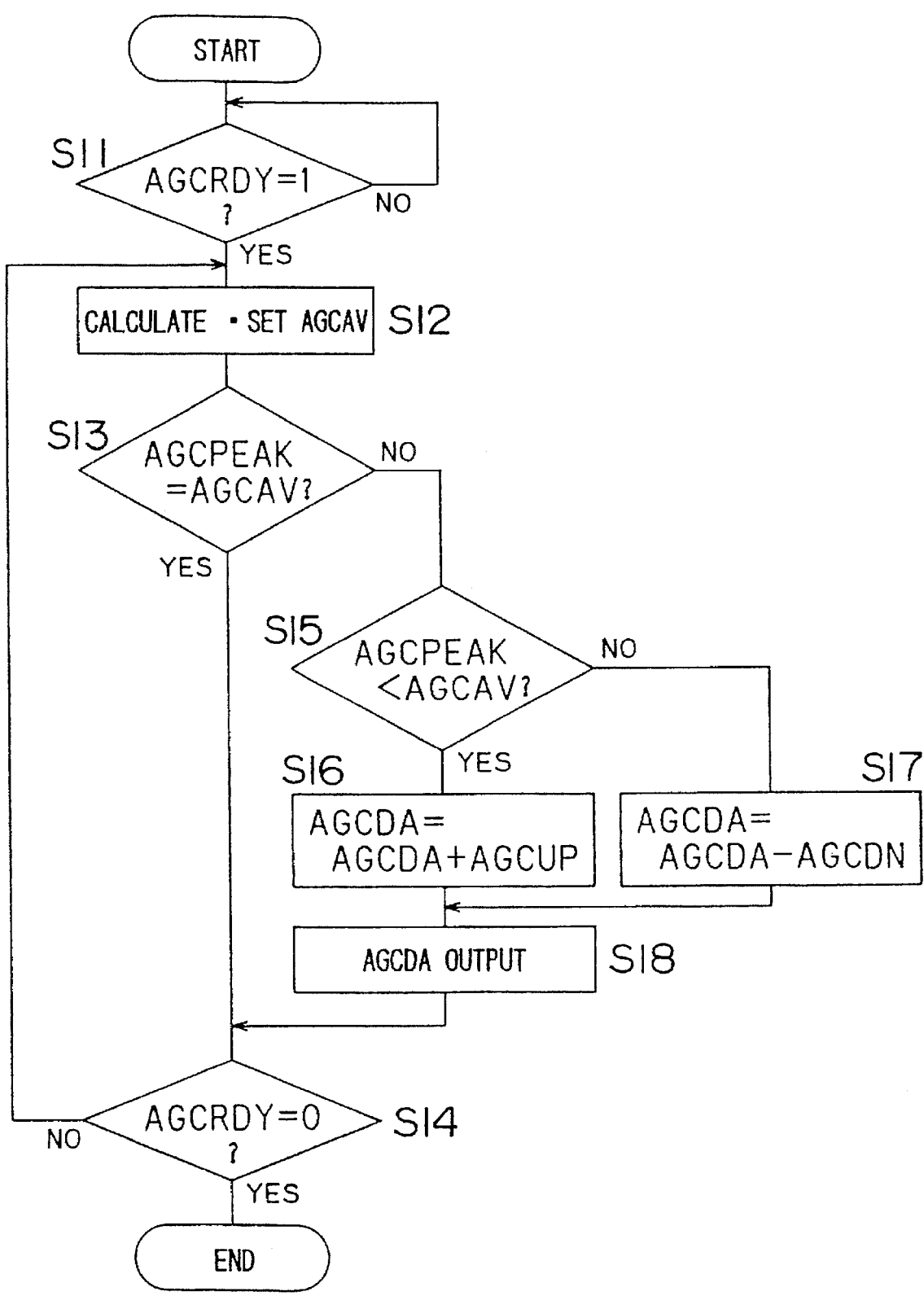
FIG. 6 is a flow chart for explaining another example of AGC processing in a digital AGC circuit.

FIG. 6 is a flow chart for explaining another example of the AGC processing in the above described digital AGC circuit 3.

Referring now to FIG. 6, another example of the AGC processing in the digital AGC circuit 3 shown in FIG. 2 will be described.

In the AGC processing unit 32, it is monitored whether or not data AGCRDY set in the register 32a is in a set state "1" (step S11). The data AGCRDY is set to "1"/"0" by the CPU 33. If the data AGCRDY becomes "1", the AGC processing is started in the AGC processing unit 32. Specifically, white reference data AGCAV is produced, and the produced white reference data AGCAV is set in the register 32b (step S12). The white reference data AGCAV is digital image data corresponding to a pure white document image, which is produced in the following manner, for example.

Specifically, the scanner 1 is caused to read a white reference plate on which a white reference image corresponding to the whitest image out of document images is formed one line at a time over m lines (for example, m=8) in a state where a light source for document illumination is turned on. The minimum value of digital image data corresponding to one line is found for each line, and the average value of the minimum values found for the respective lines is found. The average value of the minimum values corresponds to the white reference data AGCAV. That is, the white reference data AGCAV corresponds to the lower limit value of the maximum amplitude range of image data applied to the A/D converting unit 31.

If the white reference data AGCAV is set, it is judged whether or not the white reference data AGCAV is the same as data AGCPEAK set in the register 32c (step S13). The data AGCPEAK is previously set in the register 32c before starting the AGC processing by the CPU 33, which is the basis for setting the dynamic range of the image data to desired size when a document image is actually read.

More specifically, if the white reference data AGCAV is the same in value as the data AGCPEAK, the maximum amplitude range of the image data applied to the A/D converting unit 31 when the document image is actually read becomes AGCPEAK to $V_{ref}H$. If the data AGCPEAK is set to a desired value, therefore, the dynamic range can be set to a desired range.

If the white reference data AGCAV and the data AGCPEAK are the same in value as a result of the judgment in the foregoing step S13, it is judged whether or not the data AGCRDY is "0" (step S14). As a result, the AGC processing is terminated if the data AGCRDY is "0", while the program proceeds to the foregoing step S12 if the data AGCRDY is "1". In the step S12, the above described processing is repeated.

On the other hand, if the white reference data AGCAV and the data AGCPEAK are not the same in value as a result of the judgment in the foregoing step S13, it is subsequently judged whether or not the white reference data AGCAV is larger in value than the data AGCPEAK (step S15). Data AGCDA set in the register 32d is updated in accordance with the result. This data AGCDA is previously set before starting the AGC processing by the CPU 33. In the present embodiment, a value at which the low reference voltage $V_{ref}L$ in the A/D converting unit 31 becomes zero, for example, 00h (h is a sign indicating that it is hexadecimal) is set.

The data AGCDA is updated in the following manner. Specifically, if the white reference data AGCAV is larger in value than the data AGCPEAK, data AGCUP set in the register 32e is added to the data AGCDA set in the register 32d to find new data AGCDA, and the new data AGCDA is set in the register 32d (step S16). On the other hand, if the white reference data AGCAV is smaller in value than the data AGCPEAK, data AGCDN set in the register 32f is subtracted from the data AGCDA set in the register 32d to find new data AGCDA, and the new data AGCDA is set in the register 32d (step S17).

The data AGCUP and AGCDN which are the above described amount of addition or amount of subtraction are determined on the basis of the difference $D_s$ between the white reference data AGCAV and the data AGCPEAK ($D_s$=|AGCPEAK−AGCAV|) by the CPU 33, as described later.

If the data AGCDA is updated, the AGC processing unit 32 applies the updated data AGCDA to the D/A converting unit 34 (step S18).

The processing in the foregoing steps S12 to S18 is repeated until the data AGCRDY is set to "0".

The data AGCDA applied to the D/A converting unit 34 is converted into analog data in the D/A converting unit 34 in the foregoing step S18, after which the analog data is applied to the A/D converting unit 31 as a low reference voltage $V_{ref}L$. If the data AGCDA is updated, therefore, the low reference voltage $V_{ref}L$ is changed.

More specifically, if the data AGCDA is updated by the addition of the data AGCUP, the low reference voltage $V_{ref}L$ is increased. That is, the input voltage range FSR of the A/D converting unit 31 becomes narrower than that before the updating. As a result, the white reference data AGCAV found after the updating becomes smaller in value than the white reference data AGCAV found before the updating. Since the data AGCUP is added when the white reference data AGCAV is larger in value than the data AGCPEAK, the white reference data AGCAV approaches the data AGCPEAK by repeating the processing in the forgoing steps S12 to S18.

On the other hand, in a case where the data AGCDA is updated by the subtraction of the data AGCDN, which is the reverse of the above described case, the input voltage range FSR of the A/D converting unit 31 becomes wider than that before the updating. As a result, the white reference data AGCAV found after the updating becomes larger in value than the white reference data AGCAV found before the updating. Since the data AGCDN is subtracted when the white reference data AGCAV is smaller in value than the data AGCPEAK, the white reference data AGCAV approaches the data AGCPEAK also in this case.

It is possible to set the white reference data AGCAV to approximately the same value as that of the data AGCPEAK by repeating the processing in the foregoing steps S12 to S18 as described above. Consequently, the maximum amplitude range of the image data applied to the A/D converting unit CPU 33 determines the data AGCUP and AGCDN to be set on the basis of the table.

TABLE 1

|  | Difference $D_s$ |  | set value of AGCUP, AGCDN |
|---|---|---|---|
| judgment 1 | $|AGCPEAK-AGCAV| \geq 128$ | set 1 | AGCUP = AGCDN = 128 |
| judgment 2 | $64 \leq |AGCPEAK-AGCAV| < 128$ | set 2 | AGCUP = AGCDN = 64 |
| judgment 3 | $32 \leq |AGCPEAK-AGCAV| < 64$ | set 3 | AGCUP = AGCDN = 32 |
| judgment 4 | $16 \leq |AGCPEAK-AGCAV| < 32$ | set 4 | AGCUP = AGCDN = 16 |
| judgment 5 | $8 \leq |AGCPEAK-AGCAV| < 16$ | set 2 | AGCUP = AGCDN = 8 |
| judgment 6 | $4 \leq |AGCPEAK-AGCAV| < 8$ | set 6 | AGCUP = AGCDN = 4 |
| judgment 7 | $2 \leq |AGCPEAK-AGCAV| < 4$ | set 7 | AGCUP = AGCDN = 2 |
| judgment 8 | $0 \leq |AGCPEAK-AGCAV| < 2$ | set 8 | AGCUP = AGCDN = 1 |

31 can be set to AGCPEAK to $V_{ref}H$. Consequently, the dynamic range can be widened.

Figure 7A:
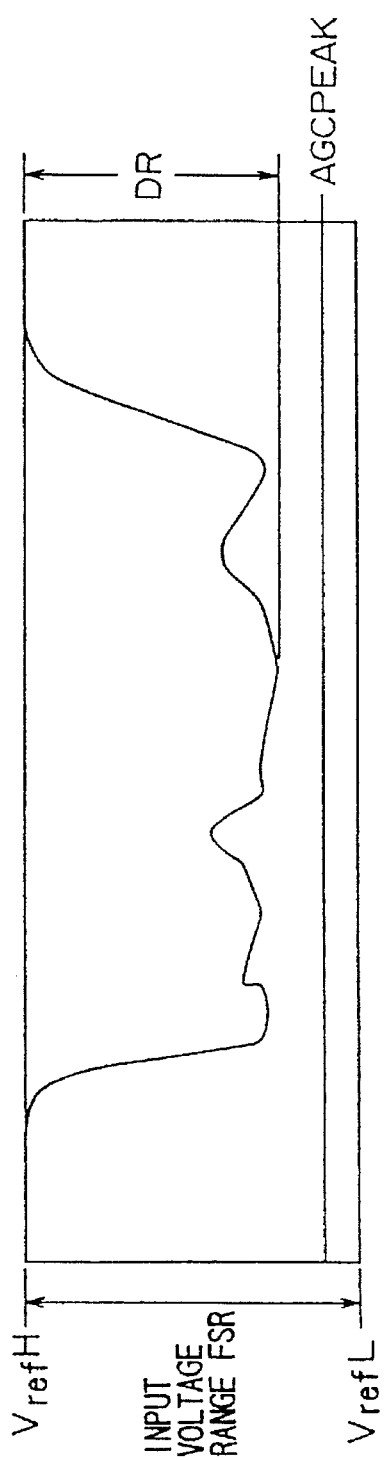
FIGS. 7(a) and 7(b) are diagrams for explaining the change in the dynamic range of image data.
Figure 7B:
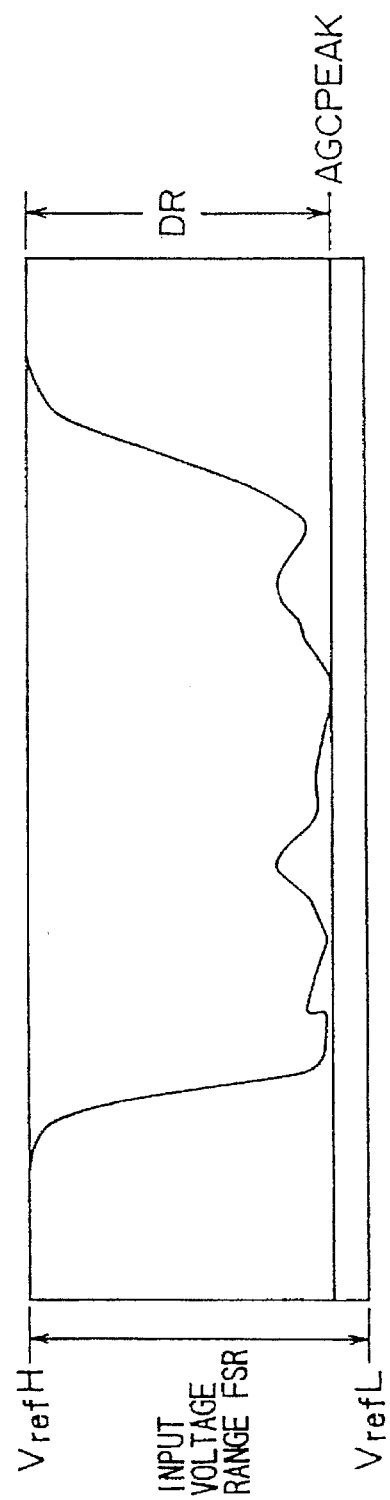

The foregoing will be described more specifically with reference to FIGS. 7(a) and 7(b). FIG. 7(a) is a diagram showing a voltage waveform of the image data applied to the A/D converting unit 31 when the document image is actually read in a case where the above described AGC processing is not performed. FIG. 7(b) is a diagram showing a voltage waveform of the image data applied to the A/D converting unit 31 when the document image is actually read in a case where the above described AGC processing is performed. In both FIGS. 7(a) and 7(b), the vertical axis corresponds to the input voltage range FSR of the A/D converting unit 31.

As can be seen from comparison between both the figures, the dynamic range DR of the image data is increased by performing the AGC processing. Therefore, if the data AGCPEAK is set to "0", for example, the maximum amplitude range of the image data coincides with the input voltage range FSR of the A/D converting unit 31, whereby the maximum dynamic range DR is obtained.

Figure 8:
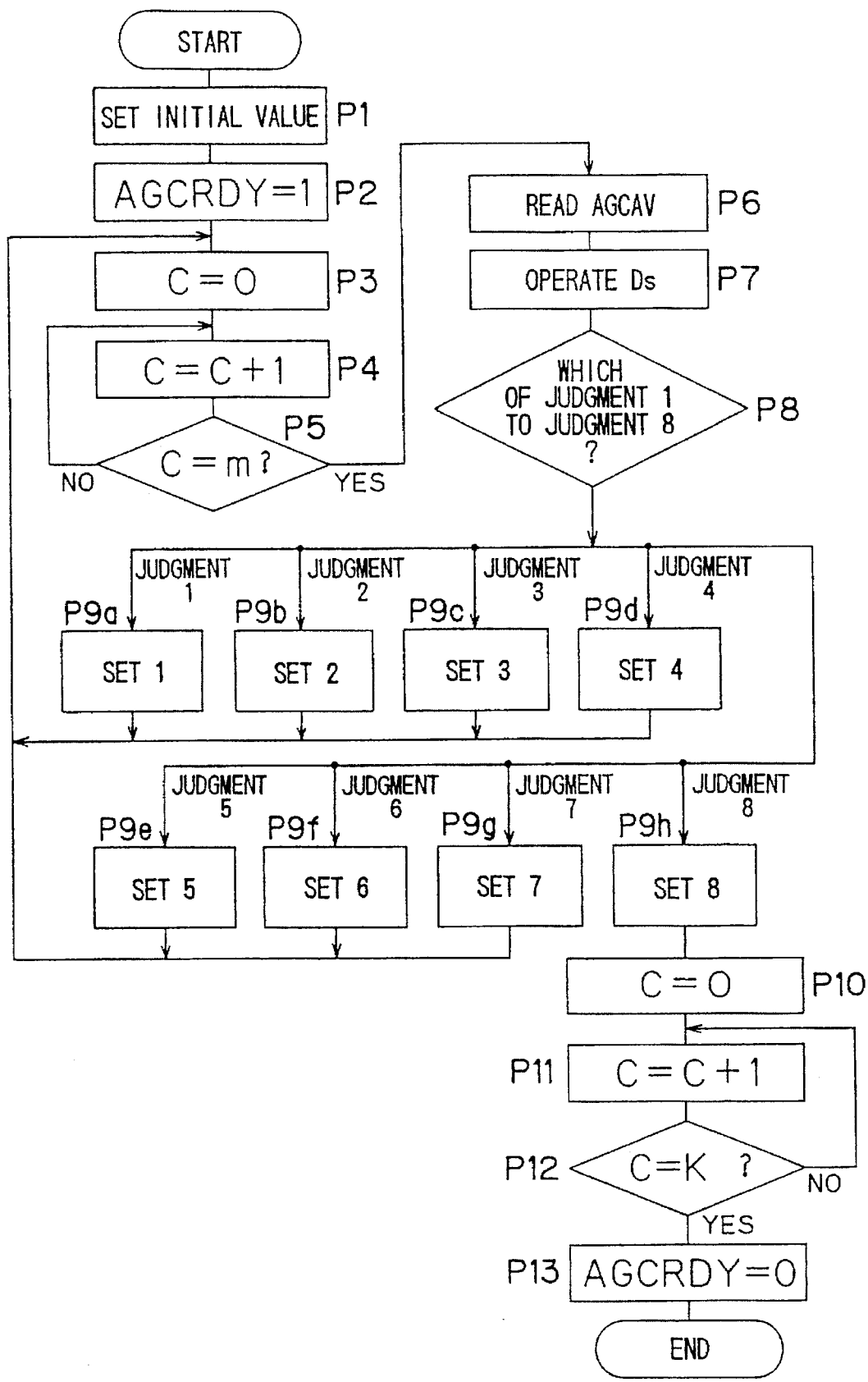
FIG. 8 is a flow chart for explaining operations performed by a CPU at the time of the AGC processing shown in FIG. 6.

FIG. 8 is a flow chart for explaining operations performed by the CPU 33 at the time of performing the AGC processing shown in FIG. 6.

In FIG. 8, the CPU 33 sets the initial values of the registers 32c and 32d in the AGC processing unit 32 (the data AGCPEAK and AGCDA), after which the data AGCRDY in the register 32a in the AGC processing unit 32 is set to "1" (steps P1 and P2). If the data AGCRDY becomes "1", the AGC processing is started, as described in FIG. 6, in the AGC processing unit 32.

Thereafter, the CPU 33 sets a count value C of a line counter to "0" representing a reset state (step P3). This line counter is incremented in response to the calculation of the minimum value of digital image data corresponding to one line in the AGC processing unit 32 (step P4). The CPU 33 increments the line counter until the count value C becomes m, that is, the white reference data AGCAV is set in the register 32d in the AGC processing unit 32 (step P5). If the count value C becomes m, the white reference data AGCAV set in the register 32b is read (step P6), and the difference $D_s$ between the white reference data AGCAV and the data AGCPEAK set in the register 32c ($D_s=|AGCPEAK-AGCAV|$) is operated (step P7).

The CPU 33 determines the data AGCUP and AGCDN to be set in the registers 32e and 32f depending on the difference $D_s$, as described in FIG. 6 (steps P8, P9a to 9h). Therefore, the CPU 33 previously stores as a table a correspondence between the difference $D_s$ and the data AGCUP and AGCDN which is shown in the following Table 1. The The difference $D_s$ is gradually reduced by repeating the processing in the steps S12 to S18 because the white reference data AGCAV approaches the data AGCPEAK, as described in FIG. 6. As a result, the difference $D_s$ is successively changed to $D_s$ in the judgment 1, $D_s$ in the judgment 2, $D_s$ in the judgment 3, . . . . . If the difference $D_s$ is judged to be $D_s$ in the judgment 8, the CPU 33 performs processing for stabilizing the AGC processing. Specifically, the white reference data AGCAV is produced by a predetermined number of times k (for example, k=2) in the AGC processing unit 32 without updating the data AGCUP and AGCDN (steps P10 to P12). More specifically, the count value C of the line counter is set to "0" representing a reset state, and the count value C is incremented until it becomes k. Consequently, the white reference data AGCAV is settled at approximately the same value as that of the data AGCPEAK.

If the count value C becomes k, the data AGCRDY is set to "0" so as to indicate the termination of the AGC processing (step P13). If the data AGCRDY becomes "0", the AGC processing is terminated, as described in FIG. 6.

As described in the foregoing, according to the present embodiment, the low reference voltage $V_{ref}L$ in the A/D converting unit 4 is only changed until the white reference data AGCAV becomes approximately the same in value as the data AGCPEAK so as to realize the AGC processing. Consequently, the necessity of an analog element and its peripheral elements is eliminated. Therefore, it is possible to simplify the circuit arrangement, as compared with that in the prior art.

Furthermore, the effect of the variations among the elements constituting the digital AGC circuit can be reduced by simplifying the circuit arrangement, thereby to make it possible to perform stable AGC processing.

Additionally, the AGC processing is performed in a digital manner using the AGC processing unit 32 and the CPU 33, thereby to make it possible to easily make fine adjustment. For example, if an output of the A/D converting unit 31 is composed of 8 bits, the adjustment can be made by resolution of $2^8$ (=256). Consequently, no components for fine adjustment only are required. Therefore, it is possible to provide a low-cost AGC circuit.

Although the present invention was described by taking a facsimile as an example, the present invention is also applicable to a copying machine and other image forming apparatuses, for example.

Furthermore, although in the above described embodiments, description was made of a case where the maximum output is obtained if the scanner 1 reads a deep black document image and the minimum output is obtained if a pure white document image is read, the present invention may be also applied to a case where the minimum output is obtained if the deep black document image is read and the maximum output is obtained if the pure white document image is read. In this case, the AGC processing may be such processing that the high reference voltage $V_{ref}H$ in the A/D converting unit 31 is changed so as to correspond to the white reference data AGCAV.

Additionally, although in the above described second embodiment, description was made of a case where the data AGCUP and AGCDN used for updating the data AGCDA are changed by the difference $D_r$, the data AGCUP and AGCDN may be fixed to predetermined values, for example.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital AGC circuit for image processing comprising analog-to-digital converting means having an input voltage range previously set for converting into digital image data analog image data outputted from optically reading means for optically reading an image to output analog image data, comprising:

range operating means for finding the maximum amplitude range of the analog image data outputted from said optically reading means; and input voltage range changing means for changing an effective input voltage range of said analog-to-digital converting means so as to correspond to the maximum amplitude range found by the range operating means.

2. The digital AGC circuit according to claim 1, wherein said range operating means finds the minimum value or the maximum value of the digital image data outputted from said analog-to-digital converting means, and said input voltage range changing means changes the minimum value or the maximum value of the effective input voltage range of said analog-to-digital converting means so as to correspond to the minimum value or the maximum value found by said range operating means.

3. A digital AGC circuit for image processing comprising analog-to-digital converting means having an input voltage range previously set for converting into digital image data analog image data outputted from optically reading means for optically reading an image to output analog image data, comprising:

setting means for setting an arbitrary value of the digital image data outputted from said analog-to-digital converting means;

minimum value operating means for finding the minimum value of the digital image data outputted from said analog-to-digital converting means;

judging means for judging whether or not the minimum value found by the minimum value operating means is the same as the arbitrary value set by said setting means; and input voltage range controlling means for changing, if it is judged as a result of the judgment in the judging means that the minimum value found by said minimum value operating means is not the same as the arbitrary value, the minimum value of an effective input voltage range of said analog-to-digital converting means so as to correspond to the minimum value found by said minimum value operating means until the minimum value becomes the same as the arbitrary value.

4. A digital AGC circuit for image processing comprising analog-to-digital converting means having an input voltage range previously set for converting into digital image data analog image data outputted from optically reading means for optically reading an image to output analog image data, comprising:

setting means for setting an arbitrary value of the digital image data outputted from said analog-to-digital converting means;

maximum value operating means for finding the maximum value of the digital image data outputted from said analog-to-digital converting means;

judging means for judging whether or not the maximum value found by the maximum value operating means is the same as the arbitrary value set by said setting means; and input voltage range controlling means for changing, if it is judged as a result of the judgment in the judging means that the maximum value found by said maximum value operating means is not the same as the arbitrary value, the maximum value of an effective input voltage range of said analog-to-digital converting means so as to correspond to the maximum value found by said maximum value operating means until the maximum value becomes the same as the arbitrary value.

5. A digital AGC circuit for image processing, comprising:

an analog-to-digital converting unit having an input voltage range previously set for converting into digital image data analog image data outputted from optically reading means for optically reading an image to output analog image data;

an AGC processing unit having a plurality of registers for storing initial values of data, said AGC processing unit being in communication with said analog-to-digital converting unit;

a central processing unit in communication with said AGC processing unit for controlling the operation of the AGC processing unit including updating data values stored in said registers;

a digital-to-analog converting unit which receives digital data stored in the registers and converts the received digital data into analog data, and said digital-to-analog converting unit being in communication with said analog-to-digital converting unit to influence the input voltage range such that said digital image data can be directly applied to the analog-to-digital converter without gain adjustment.

6. A digital AGC circuit as described in claim 5, wherein a first of said registers is designed to store data corresponding to a pure white digital image provided by the optically reading means based on a white reference plate, and said central processing unit is in communication with said first register and directs said AGC processing unit to forward data to said digital-to-analog converting unit to alter the input voltage range based on the data corresponding to the pure white digital image stored in said first register.

7. A digital AGC circuit for image processing comprising analog-to-digital converting means having an input voltage range previously set for converting into digital image data analog image data outputted from optically reading means for optically reading an image to output analog image data, comprising:

range operating means for finding the maximum amplitude range of the analog image data outputted from said optically reading means; and input voltage range changing means for changing an effective input voltage range of said analog-to-digital converting means so as to correspond to the maximum amplitude range found by the range operating means such that the analog image data provided from said optically reading means is directly receivable by said analog-to-digital converting means without gain adjustment.

* * * * *